June 15, 1926.
J. F. SCHLOEMER
EGG CASE CUSHION FLAT
Filed August 28, 1924
1,588,624
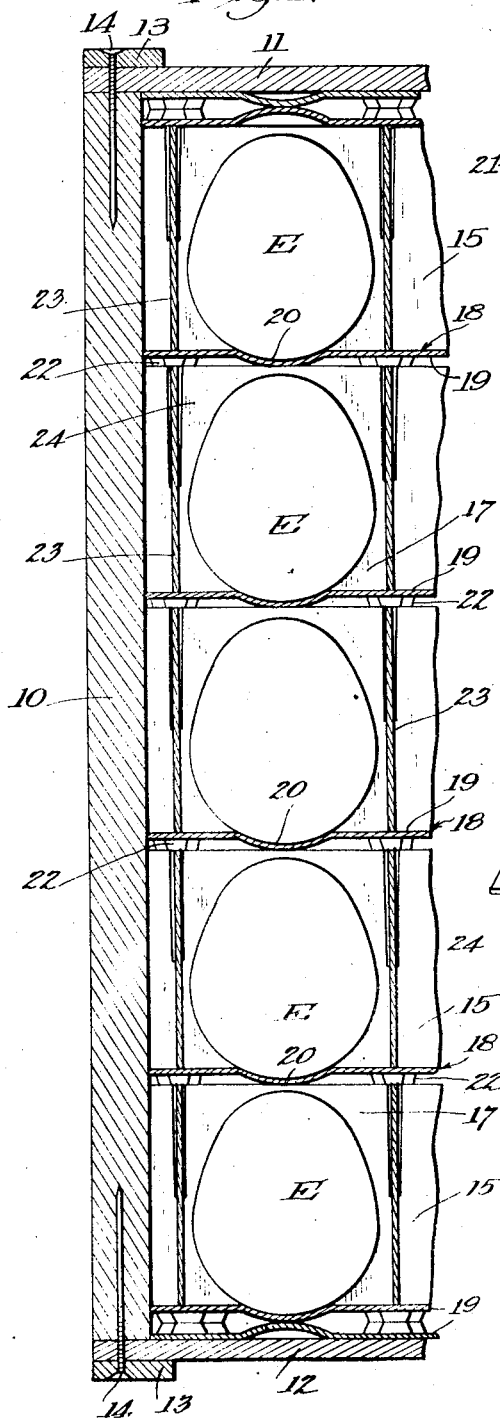
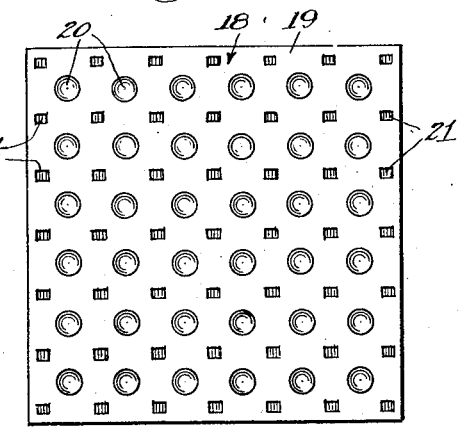
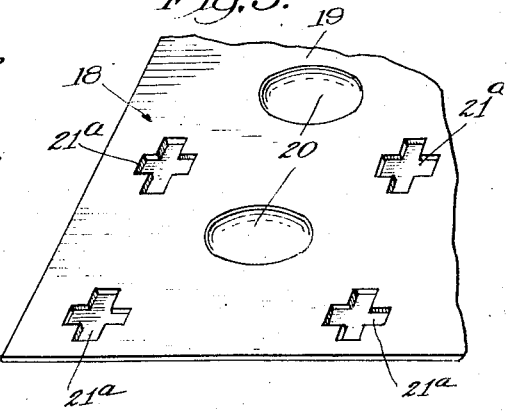
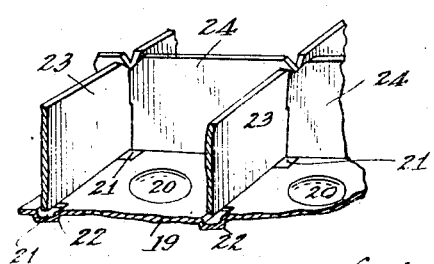
Inventor:
J. F. Schloemer,
by Hazard and Miller
Attorneys Patented June 15, 1926.

1,588,624

UNITED STATES PATENT OFFICE.

JOHN F. SCHLOEMER, OF LOS ANGELES, CALIFORNIA.

EGG-CASE CUSHION FLAT.

Application filed August 28, 1924. Serial No. 734,642.

This invention relates to improvements in cushion flats in egg crates.

It is an object of the invention to provide a flat adapted to be inserted between one or more superposed fillers for an egg crate which will have egg receiving depressions formed therein adapted to be disposed centrally of the cells of the fillers.

It is a further object of the invention to provide a flat adapted to be inserted between one or more superposed fillers of egg crate which will have projections formed upon the underside thereof, adapted to rest upon the subjacent filler at the point of intersection of the walls of such filler.

It is a further object of the invention to provide a flat for an egg crate which may be cheaply and simply made and which may be much thinner than those heretofore employed, thereby reducing the space required in the egg crate to properly support the eggs for shipment.

With the foregoing and other objects in view, reference is had to the accompanying drawings for an illustrative embodiment of the invention, wherein Fig. 1, is a vertical section taken through a portion of an egg crate in which the improved filler has been inserted.

Fig. 2, is a top plan view of one modification of the filler.

Fig. 3, is a partial view in perspective of another modification of the improved filler.

Fig. 4, is a partial perspective showing the association between the filler and the improved flat.

Referring to the accompanying drawings wherein similar reference characters designate similar parts throughout, the egg case shown in Figure 1 is of conventional construction having a side wall 10 with a top wall 11 and a bottom wall 12 secured thereto by means of nailing straps 13 through which are driven nails 14 or other securing elements. Within the egg case is disposed a plurality of superposed fillers 15 or division plates which are of conventional construction and provide cells 17 adapted to receive the eggs E. Interposed between the fillers 15 is a flat 18 of the improved construction.

The flats shown in Figure 2 consist of a flat sheet of cardboard 19 having a plurality of recesses or depressions 20 formed in the top surface thereof adapted to receive the eggs E. These depressions 20 are so arranged upon the sheet 19 as to be disposed centrally over each of the cells 17. Between the depressions 20 are formed other depressions 21, also formed in the top surface of the sheet 19 so as to form projections 22 upon the under side of the sheet.

In the form shown in Figure 2, these projections 22 and recesses 21 are substantially square or rectangular in form. The projections 22 are adapted to rest upon the intersections of the walls 23 and 24 of the fillers 15. In some cases where notches are provided in the intersections of the walls 23 and 24, the projections 22 are adapted to fit within these notches. Where other forms of fillers 15 are employed, the projections 22 are adapted to rest directly on top of the point of intersection.

By having the projections 22 resting upon the intersections of the walls, it is seen that the projections 22 have the combined supporting edges of both the walls 23 and 24, whereas if the projections 22 were adapted to rest upon the walls 23 and 24 intermediate their points of intersection, a much weaker support would be provided.

In the modification shown in Figure 3, the recesses 21ª and the projections formed thereby are cross like in form so that the opposed arms of each cross like projection will bear upon that portion of the walls 23 and 24 extending away from their points of intersection, thereby providing an increased supporting surface for the flat although leaving the central portion of the flat about the egg receiving recess 20 substantially flat.

An important feature of this invention should be emphasized and which consists of the fact that by providing the projections 22, the height of each cell within the egg crate is lengthened. The projections 22 allow the height of each cell to be increased an eighth of an inch or more, thus providing sufficient space to allow for packing of oversize eggs in the same cases which have heretofore been employed, also by lengthening the height of each cell, a small space is provided between each layer of eggs when the eggs are of normal size and thus reduces breakage.

It is to be understood that various changes in the details of construction may be made without departing from the spirit or scope of the invention as defined by the appended claims.

What I claim is:

1. An egg case cushion flat comprising a sheet of material having egg receiving depressions formed on one side thereof adapted to be disposed centrally of the cells of the filler and other depressions formed upon the same side of the sheet forming projections projecting from the plane of the sheet on the opposite side adapted to rest on the walls of a subjacent filler.

2. An egg case cushion flat comprising an imperforate sheet of cardboard, egg receiving depressions formed upon the upper side of said sheet adapted to be disposed centrally of the cells of a filler, and other depressions formed upon the upper side of said sheet so as to form projections projecting from the plane of the sheet upon the underside thereof adapted to rest upon the walls of a subjacent filler at their points of intersection.

3. An egg case cushion flat comprising a flat sheet of cardboard, egg receiving depressions formed in the upper side of said sheet, and other depressions formed upon the upper side of said sheet so as to form cross like projections upon the underside of said sheet, said projections being adapted to rest over the intersections of a subjacent filler, with the arms of said cross like projections resting upon the walls of the filler.

4. An egg case cushion flat comprising a sheet of material having egg receiving depressions formed on one side thereof adapted to be disposed centrally of the cells of the filler, and means spaced from said depressions forming projections projecting from the plane of the sheet on the opposite side of the sheet adapted to rest on the walls of a subjacent filler.

In testimony whereof I have signed my name to this specification.

JOHN F. SCHLOEMER.